United States Patent [19]

Zaslavskaya et al.

[11] 4,079,435

[45] Mar. 14, 1978

[54] METHOD OF PROTECTING POWER TRANSMISSION LINES AND APPARATUS FOR REALIZING SAME

[76] Inventors: Tamara Borisovna Zaslavskaya, ulitsa Sovetskaya 20, kv. 77, Novosibirsk; Veniamin Lvovich Fabrikant, ulitsa Angenskalna 22a, kv. 55, Riga; Ljudmila Ivanovna Pushkareva, ulitsa Geodezicheskaya 4, kv. 60, Novosibirsk; Vladimir Nikolaevich Chuvychin, ulitsa Dzirnavu 27, kv. 14, Riga, all of U.S.S.R.

[21] Appl. No.: 714,195

[22] Filed: Aug. 13, 1976

[51] Int. Cl.² .............................................. H02H 3/28
[52] U.S. Cl. ........................................ 361/82; 361/68
[58] Field of Search ..................... 361/67–69, 361/66, 76, 79, 86, 87; 324/51, 52

[56] References Cited

U.S. PATENT DOCUMENTS

| | | | |
|---|---|---|---|
| 2,296,784 | 9/1942 | Harder | 361/76 |
| 2,641,634 | 6/1953 | Marihart | 361/76 X |
| 3,225,256 | 12/1965 | Carter et al. | 361/76 X |
| 3,405,320 | 10/1968 | Schwanenflugel | 361/82 X |
| 3,590,368 | 6/1971 | Esclangon | 361/68 X |

*Primary Examiner*—J D Miller
*Assistant Examiner*—Patrick R. Salce

*Attorney, Agent, or Firm*—Lackenbach, Lilling & Siegel

[57] ABSTRACT

The method of protecting power transmission lines is, accpording to the invention, based on a comparison between the actual quantities of current and/or voltage at the beginning of the protected section of a power transmission line and the same quantities of current and/or voltage calculated by means of current and voltage parameters at the end of the protected section providing there are no faults in this section. In apparatuses for realization of this method the voltage and current at the end of the protected section are multiplied in symmetrical components multipliers by respective coefficients of an equivalent four-terminal network substituting for the protected section and summed up. If there are no faults in this section, this calculated sum is equal to the respective electrical quantity at the beginning of the protected section. The electrical quantity measured at the beginning of the section is transmitted along a communications channel to the end of the section, where it is compared in a special unit with the respective calculated quantity. When a fault appears in the protected section, the equation of the compared quantities is upset and the effector of the apparatus operates. The proposed apparatus permits protection of conventional, long-range and adjusted power transmission lines of high and superhigh voltage.

6 Claims, 9 Drawing Figures

METHOD OF PROTECTING POWER TRANSMISSION LINES AND APPARATUS FOR REALIZING SAME

This invention relates to relay protective devices for power transmission lines and, in particular, to a method of protecting power transmission lines and apparatuses for realizing same.

The invention can be employed in all possible networks of AC high and superhigh voltage power transmission lines, adjusted power transmission lines (unit, semiunit and integrated variations), compensated long-range power transmission lines and conventional high and superhigh voltage transmission lines of comparatively short ranges.

The field of power engineering is constantly facing the problems of high and superhigh voltage transmission and energy transmission over great distances.

This can be attributed to the following: the necessity to pool power systems; transmission of large amounts of energy from areas possessing huge reserves of water power and fuel to areas where consumers of energy are concentrated and power reserves are insufficient; transmission of high power energy over short distances; further expansion of nuclear power energetics because super powerful nuclear stations are limited as to their location within a country (biological protection, water supply requirements).

The problem of energy transmission over long and superlong distances can be solved by means of three-phase AC or DC power transmission lines. If the wave length of AC transmission lines does not exceed 60 electrical degrees, which corresponds to approximately 1,000 km for 50 hz AC frequency, conventional or compensated AC power transmission lines are used. A power transmission line with a wave length equal to 180 electrical degrees (3,000 km at 50 hz) is called a half-wave power transmission line and, consequently, its operation is referred to as halfwave transmission. Power transmission lines within the wave length of 120–240 electrical degrees (2,000–4,000 km at 50 hz) were proposed to employ this halfwave transmission.

Power transmission lines with a wave length other than 180 electrical degrees should be adjusted by means of special devices so that their wave length is bought to 180 electrical degrees to ensure the required level of electromechanical and electromagnetic stability. Such power transmission lines were named adjusted lines. Thus the term "adjusted power transmission lines" implies such transmission lines wherein the inherent wave length is within 120–240 electrical degrees and is adjusted by means of special devices to halfwave operation.

The wave nature of electromagnetic energy propagating along adjusted power transmission lines defines the peculiarities of their operation.

Due to long ranges and insignificant active resistance of power transmission lines, the time of damping transients is substantial.

In adjusted power transmission lines, in contrast to usual lines, free components of the short circuit current are periodic and, depending on the location of a fault, they can comprise various frequency spectra, including commercial frequencies (50 hz).

The nature of changes of dependent current components and voltage components, input resistances, short circuit power in adjusted transmission lines differ appreciably from that of conventional long-range power transmission lines, their distinctive features being: presence of resonance and dead zones, similar current distribution and input resistance variations during inside and outside short circuits, phase angles of currents and voltages cannot be an indication of a short circuit in the protected section, operations of dischargers, a line corona.

The above enumerated peculiarities of adjusted power transmission lines operation make it impossible to employ known methods and respective devices for delay protection.

There is known a method of protecting power transmission lines, which includes a comparison between the quantities of currents flowing at the ends of the protected section. In the apparatus realizing said method the signals proportional to currents are transformed in an amplitude-phase device so that the phase of the output voltage is defined by the current value. A comparator compares phase values of signals formed in amplitude-phase devices positioned at the ends of the protected section. The protection system actuates a disconnector at a prodetermined phase difference.

There is also known a method of protecting power transmission lines based on comparison between the phase voltage difference and the product of current by characteristic impedance at the beginning and at the end of the protected section, that is comparison between similar electrical quantities at the ends of the protected section.

There is also known a method of protecting power transmission lines based on comparison between the phase voltage difference and the product of current by characteristic resistance at the beginning and at the end of the protected section, that is the comparison between similar electrical quantities at the ends of the protected section.

An apparatus for protection of power transmission lines based on this method and employed to protect multiphase power transmission lines comprises a set of single-phase protection relays. The difference between the phase voltage of the line and the product of current by characteristic resistance is measured at the beginning and at the end of the protected section of the line. These signals are compared with consideration for the linear damping of the wave propagating along the line. The beginning and the end of the protected section are connected by a communications cable to a controllable damping compensator. The apparatus comprises phase voltage and phase current measuring units for each phase separately at the beginning and at the end of the protected section. Quantities of currents and voltages are supplied from the measuring units to a computing device comprising a digitizer and a computing block. The digitizer resolves signals from all three phases and each millisecond converts them into digits to be fed to the computing block wherein two signals are calculated:

$$U1 = V1 + K1V2 + V3 - Z_c1(J1 + C1J2 + J3) \quad (1)$$

$$U2 = V1 - V3 - Z_c2(J2 - J3) \quad (2),$$

where
$U1, U2$, respectively, are the first and the second signals calculated in the computing block;
$V1, V2, V3, J1J2J3$ are phase voltages and phase currents of the phases 1,2 and 3, respectively;

$K1$ and $C1$ are coefficients of interphase propagation for voltages and currents, respectively;

$Z_c1$ and $Z_c2$ are characteristic impedances for interphase and bifilar propagation, respectively, the sign of current is positive from the beginning of the protected section to its end.

The signals calculated in the computer block positioned at the beginning of the protected section are fed to the memory unit and then to the comparator. The same signals are fed by the communications cable to the memory unit and then to the comparator from the computing block positioned at the end of the protected section. The comparator delivers the following quantities:

$$S1 = e^{-\alpha 1} U1(n) - U1(m) \quad (3)$$

$$S2 = e^{-\alpha 2} U2(n) - U1(m) \quad (4),$$

where $m$ is the index of the beginning of the protected section;

$n$ is the index of the end of the protected section;

$\alpha 1$ and $\alpha 2$ are active members of coefficients of interphase and bifilar propagation, respectively.

The values $S1$ and $S2$ are supplied to the calculating unit, wherein they are transformed into three signals proceding then through the selection unit:

$$Q1 = \frac{S1}{Z_c 1} - \frac{S2}{Z_c 2} \quad (5)$$

$$Q2 = \frac{S2}{Z_c 2} \quad (6)$$

$$Q3 = \frac{S1}{Z_c 1} + \frac{S2}{Z_c 2} \quad (7).$$

If $Q1$, $Q2$ and $Q3$ are equal to zero, there is no fault. If two of these quantities are difference from zero, the fault is in the third stage. During an interphase short circuit all quantities are different from zero.

The forementioned methods and respective apparatuses for protection of power transmission lines are unsuitable for long range and adjusted transmission lines, since the compared quantities are only slightly different from one another at the ends of the protected section of such lines. There is known a method for protecting power transmission lines based on comparing phases of electrical quantities at the ends of the protected section of a power transmission line. Phase of currents, for example, are compared at the ends of the protected section. Under normal operational conditions and during an outside short circuit current phases at the ends of the protected section coincide. The cut-off signal at the output of the phase comparator is absent. During a short circuit in the protected section current phases at the ends of the protected section are shifted by 180° with respect to one another and a cut-off signal appears at the output of the phase comparator.

There is known an apparatus for high-frequency differential phase protection based on the forementioned method of comparing the phases of electrical quantities at the ends of the protected section of a line. The apparatus comprises two current measuring units made as current transformers and positioned at the beginning and at the end of the protected section. The output of said current measuring units is connected to symmetrical components separation units, whose outputs are joined to starting elements. The output of the starting element positioned at the beginning of the protected section is connected to a data conversion and transmission unit and via a communications channel to a receiver positioned at the end of the protected section. A phase comparing unit is positioned at the end of the protected section featuring two inputs, one of them being connected to the starting element at the end of the protected section and the other to the receiver.

The apparatus operates as follows. The three-phase current system is supplied from the outputs of the current measuring units to the input of the symmetrical components separation unit. The single-phase current is fed from the output of these filters to respective starting elements. In case of an outside short circuit or a short circuit in the protected section the starting elements at both ends of the protected section operate. In this case rectangular pulses are produced at the output of the starting elements, which are formed from a half sinusoid of the output current of the symmetrical components separation unit.

Thus formed rectangular pulses are fed via the data conversion and transmission unit, the communications channel and the receiver to one input of the phase comparing unit, its second input being fed the rectangular pulses from the output of the starting element at the end of the protected section. When said rectangular pulses shift at the input of the comparison unit, which corresponds to a short circuit within the protection zone, a cut-off signal is generated at the output of the comparator.

The above described method for protection of power transmission lines based on comparing phases of electrical quantities at the ends of the protected section of a line and a corresponding apparatus cannot be employed for protection of long range and adjusted power transmission lines, since the wave parameters of the forward, backward and zero phase sequences are different and changes of phases of electrical quantities at the ends of the protected sections in normal and emergency operating conditions can be similar. That means the phase change of these quantities cannot serve as an indication of a fault in the protected section of a long-range or an adjusted power transmission line.

Employment of all the above described methods and apparatuses for protection of long-range and adjusted power transmission lines is unsuitable because of possible nonselective operation of known protection systems in case of swinging the asynchronous operation in the system, as well as in overloaded conditions, since the compared electrical quantities at the ends of protected sections may be equal to the respective quantities in the event of an emergency. Besides, in case of a short circuit both the voltage and the current comprise free harmonic components of different frequencies, including those close to commercial frequencies, thus bringing about incorrect action of the protecting devices.

An object of this invention is to provide protection for AC high and superhigh voltage power transmission lines and adjusted, compensated and conventional transmission lines of high and superhigh voltage and comparatively short ranges, which do not depend on operational conditions of the line and the presence of free harmonic components in the short circuit current.

This is achieved by a method for protection of a power transmission line based on a comparison between the actual quantity of current or voltage, or current and voltage, at the beginning of the protected section of the power transmission line and the quantity of current and/or voltage calculated when there are no faults in the protected section. Current and voltage are, according to the invention, measured at the end of the protected section; respective symmetrical components are separated from the current and voltage at the end of the protected section; each of the separated symmetrical components of the current and voltage is multiplied by a respective coefficient of an equivalent four-terminal network substituting for the protected section; when voltages are compared, the separated symmetrical components of voltage and current are multiplied by the first and second coefficients of the equivalent four-terminal network respectively; when currents are compared, they are multiplied by the third and fourth coefficients of the equivalent four-terminal network respectively; whereas, when currents and voltages are compared, the symmetrical components of the voltage are multiplied by the first and third coefficients and the symmetrical components of the current are multiplied by the second and fourth coefficients of the equivalent four-terminal network substituting for the protected section; in the case current symmetrical components are multiplied by a respective coefficient of the equivalent four-terminal network substituting for the protected section, voltage symmetrical components are obtained which are proportional to the current at the end of the protected section, then all multiplied voltage symmetrical components are added and as a result an equivalent voltage is obtained, and, when voltages are compared, the equivalent voltage is proportional to the voltage at the beginning of the protected section calculated when there are no faults in the protected section, when currents are compared, the equivalent voltage is proportional to the current at the beginning of the protected section calculated on the above mentioned condition, and, when currents and voltages are compared, the equivalent voltage is proportional to the sum of the voltage and current at the beginning of the protected section calculated on the same condition; then a fundamental harmonic is separated from the equivalent voltage; current or voltage or current and voltage are measured at the beginning of the protected section; a symmetrical component is separated from current or voltage or current and voltage; the fundamental harmonic is separated from the already separated symmetrical components of current or voltage at the beginning of the protected section; when current or voltage are compared, the fundamental harmonic of the current symmetrical component is in compliance with the fundamental harmonic of the voltage proportional to the current at the beginning of the protected section, and, when current and voltage are compared, the fundamental harmonic is separated from the compensated voltage proportional to the sum of the current and voltage symmetrical components; then the fundamental harmonic from the equivalent voltage is added to the fundamental harmonic from the separated symmetrical components of either current or voltage or compensated voltage; and a difference of these fundamental harmonics is obtained as a result; said difference of the fundamental harmonics is compared to the fundamental harmonic from the separated symmetrical component of the current at the beginning of the protected section when currents were compared,, and, when voltages are compared, the difference of the fundamental harmonics is compared to the fundamental harmonic from the separated symmetrical component of the voltage at the beginning of the protected section, and, when currents and voltages are compared, the difference of the fundamental harmonics is compared to the fundamental harmonic from the compensated voltage.

This invention provides an apparatus, for realization of the method for protection of a power transmission line based on the comparison between the actual quantity of current at the beginning of the protected section of the transmission line, which is transmitted along a communications channel by means of a data transmission unit and a data reception unit, and the quantity of current calculated when there are no faults in the protected section, which according to the invention comprises: current measuring units, one of them being positioned at the end of the protected section of the power transmission line and the other being positioned at the beginning of the protected section, a voltage measuring unit, positioned at the end of the protected section; three symmetrical components separation units transforming the three-phase system of current and voltage into a single-phase system, two symmetrical components separation units being positioned at the end of the protected section, one of them being connected to the voltage measuring unit and the other being connected to the current measuring unit positioned at the end of the protected section, whereas the third symmetrical components separation unit is positioned at the beginning of the protected section and is connected to the current measuring unit positioned at the beginning of the protected section; symmetrical components multipliers which multiply separated symmetrical components by respective coefficients of the equivalent four-terminal network substituting for the protected section, the symmetrical components multipliers being positioned at the end of the protected section and each of them being connected respectively to one of the two symmetrical components separation units positioned at the end of the protected section, the symmetrical components multipliers being provided wth a common output; fundamental harmonic separation units, one of them being positioned at the end of the protected section and being connected to the common output of the symmetrical components multipliers and the other being positioned at the beginning of the protected section and being connected to the third symmetrical components separation unit; an adder intended for summation of compared electrical quantities and being positioned at the end of the protected section, one input of the adder being connected to the output of the fundamental harmonic separation unit positioned at the end of the protected section and the other input of the adder being connected via the data reception unit, the communications channel and the data transmission unit to the fundamental harmonics separation unit located at the beginning of the protected section; an amplification unit connected to the output of the adder; a comparator, one of its inputs being connected to the amplification unit and the other input being joined to said other input of the adder; an effector which cuts off said protected section of the power transmission line if it is damaged connected to the output of the comparator.

This invention also provides an apparatus for realization of protection of a power transmission line based on a comparison between the actual quantity of voltage at the beginning of the protected section of the power transmission line which is transmitted along a communications channel by means of a data transmission unit and a data reception unit, and the quantity of voltage calculated when there is no fault in the protected section, which, according to the invention, comprises: a current measuring unit positioned at the end of the protected section; voltage measuring units, one of them being positioned at the end of the protected section, three symmetrical components separation units transforming the three-phase current and voltage system into a single-phase system, two symmetrical components separation units being positioned at the end of the protected section, one of them being connected to the current measuring unit and the other being connected to the voltage measuring unit positioned at the end of the protected section, whereas the third symmetrical components separation unit is located at the beginning of the protected section and connected to the voltage measuring unit positioned at the beginning of the protected section; symmetrical components multipliers which multiply separated symmetrical components by respective coefficients of the equivalent four-terminal network substituting for the protected section, the symmetrical components multipliers being positioned at the end of the protected section and each of them being connected respectively to one of the two symmetrical components separation units located at the end of the protected section, the symmetrical components multipliers being provided with a common output; fundamental harmonic separation units, one of them being positioned at the end of the protected section and being connected to the common output of the symmetrical components multipliers and the other being positioned at the beginning of the protected section and being connected to the third symmetrical components separation unit; an adder intended for summation of compared electrical quantities positioned at the end of the protected section, one input of the adder being connected to the output of the fundamental harmonic separation unit located at the end of the protected section and the other input of the adder being connected via the data reception unit, the communications channel and the data transmission unit to the fundamental harmonic separation unit located at the beginning of the protected section; an amplification unit connected to the output of the adder; a comparator, one of its inputs being connected to the amplification unit and the other input being connected to said other input of the adder; an effector which cuts off the protected section of the power transmission line if it is damaged connected to the output of the comparator.

This invention also provides another apparatus for realization of the method for protection of a power transmission line based on comparison between the actual quantities of voltage and current at the beginning of the protected section of the power transmission line which are transmitted along a communications channel by means of a data transmission unit and a data reception unit, and the quantities of current and voltage calculated when there are no faults in the protected section, which, according to the invention, comprises: current measuring units, one of them being positioned at the end of the protected section and the other at the beginning of the protected section; voltage measuring units, one of them being positioned at the end of the protected section and the other at the beginning of the protected section; four symmetrical components separation units transforming the three-phase current and voltage system into a single-phase system, two symmetrical components separation units being positioned at the end of the protected section, one of them being connected to the voltage measuring unit and the other being connected to the current measuring unit, whereas the third and fourth symmetrical components separation units are located at the beginning of the protected section and are connected respectively to the current measuring unit and the voltage measuring unit positioned at the beginning of the protected section, the third and the fourth symmetrical components separation units are provided with a common output; four symmetrical components multipliers which multiply separated symmetrical components by respective coefficients of the four-terminal network substituting for the protected section, the symmetrical components multipliers are located at the end of the protected section, the first two of the four symmetrical components multipliers are provided with a common output connected to the symmetrical components separation unit connected to the voltage measuring unit, the third and the fourth symmetrical components multipliers are provided with a common output connected to the symmetrical components separation unit connected to the current measuring unit, the four symmetrical components multipliers being provided with a common output; fundamental harmonic separation units, one of them being positioned at the end of the protected section and being connected to the common output of the four symmetrical components multipliers and the other being positioned at the beginning of the protected section and being connected to the common output of the third and fourth symmetrical components multipliers; an adder intended for summation of compared electrical quantities and located at the end of the protected section, one input of the adder being connected to the output of the fundamental harmonic separation unit located at the end of the protected section and the other input of the adder being connected via the data reception unit, the communications channel and the data transmission unit to the fundamental harmonic separation unit located at the beginning of the protected section; an amplification unit connected to the output of the adder; a comparator, one of its inputs being connected to the amplification unit and the other input being connected to said other input of the adder; an effector which cuts off the protected section of the power transmission line if it is damaged connected to the output of the comparator.

The proposed methods and apparatuses for protection of a power transmission line made in accordance with the present invention can successfully solve the above mentioned objects.

The invention will now be described in greater detail with reference to specific embodiments thereof, taken in conjunction with the accompanying drawings, wherein.

Figure 9:
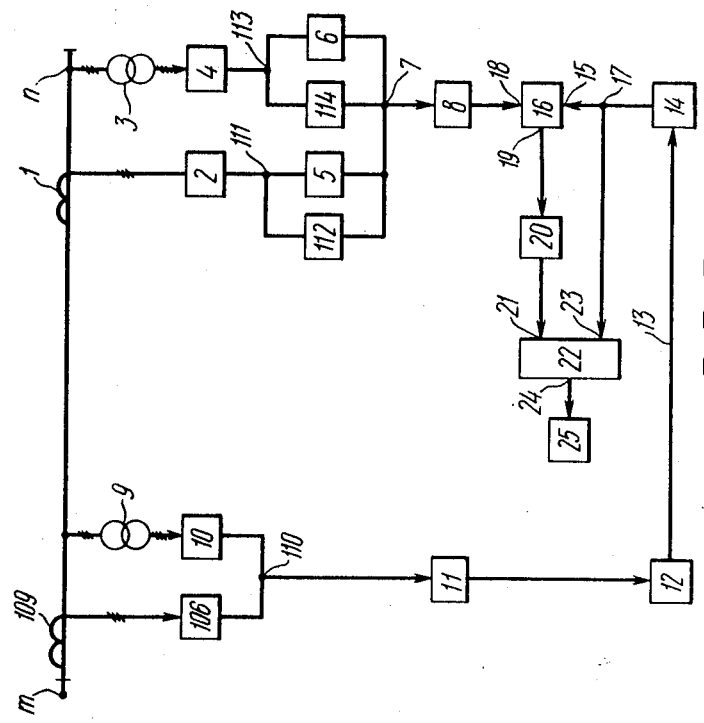
Figure 8:
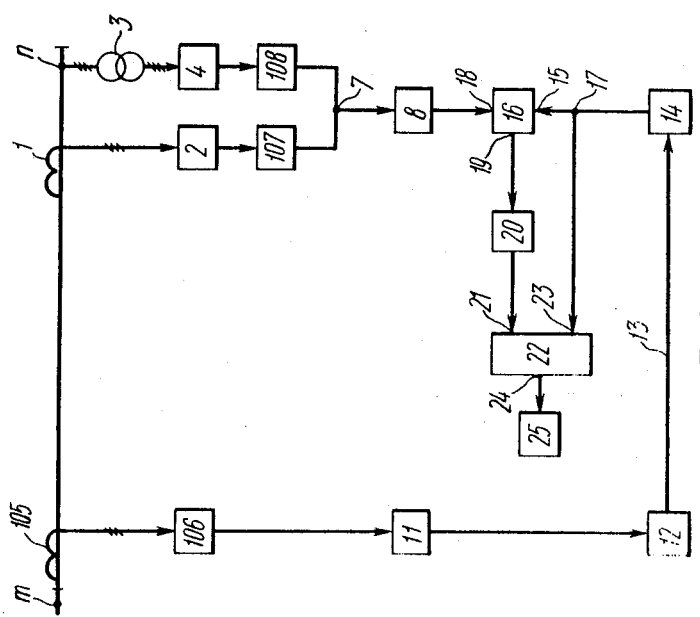

FIG. 8 shows a block diagram of an apparatus for protection of a power transmission line with respect to current based on a comparison between the current at the beginning of the protected section of the power transmission line and the quantity of current calculated when there are no faults in the protected section, according to the invention; and FIG. 9 shows a block diagram of an apparatus for protection of a power transmission line with respect to current and voltage based on a comparison between the quantities of voltage and current at the beginning of the protected section of the power transmission line and the same electrical quantities calculated when there are no faults in the protected section, according to the invention.

For better understanding of the operation of the apparatus for protection of a power transmission line its block diagram is presented as a single-line circuit. The actual connection will become evident when dealing with concrete embodiments of the invention.

An apparatus for protection of a power transmission line with respect to voltage comprises a current measuring unit made as a current transformer 1 (FIG. 1) coupled to the input of a symmetrical components separation unit made as a symmetrical current components filter 2, e.g. a reverse filter. A voltage measuring unit made as a voltage transformer 3 is connected to the input of a symmetrical components separation unit made as a voltage symmetrical components filter 4, e.g. a reverse filter. The transformer 1 and the transformer 3 are located at the end of the protected section mn of the power transmission line at the point n. The outputs of filters 4 and 2 of voltage and current respectively are connected to multipliers 6 and 5 which multiply symmetrical components by coefficients equivalent to the coefficients A and B of a four-terminal network substituting for the protected section mn. The symmetrical components multipliers 5 and 6 are provided with a common output 7 which is jointed to a fundamental harmonic separation unit made as a band-pass filter 8.

A voltage measuring unit is positioned at the beginning of the protected section mn of the power transmission line at the point m. The unit is made as a voltage transformer 9 connected to a symmetrical components separation unit made as a symmetrical components voltage filter 10, e.g. a reverse filter. The output of the voltage filter 10 is connected via a fundamental harmonic separation unit made as a band-pass filter 11 to a data transmission unit 12. The output of the data transmission unit 12 is connected via a communications channel 13 and a data reception unit 14 to an input 15 of an adder 16 through an outlet 17. An input 18 of the adder 16 is coupled to the band-pass filter 8. An output 19 of the adder 16 is connected through an amplification unit 20 to an input 21 of a comparator 22. The other input 23 of the comparator 22 is coupled to the outlet 17. An output 24 of the comparator 22 is connected to an effector 25.

Figure 2:
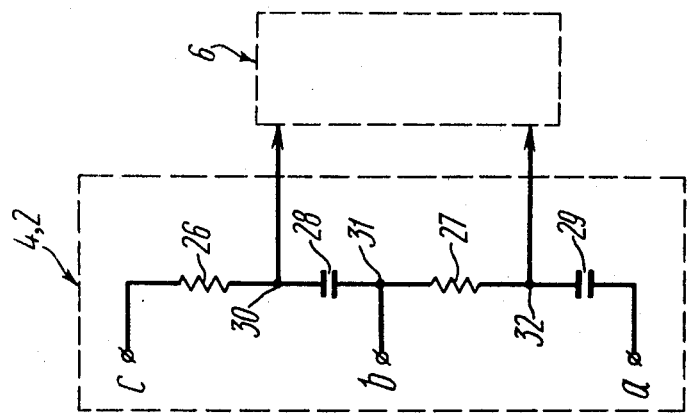
FIG. 2 is an electrical schematic diagram of a symmetrical components separation unit, according to the invention.

Referring now to FIG. 2, the electrical schematic diagram of the voltage symmetrical components filter 4 shows a circuit of a standard active capacitor filter. Here a, b and c denote phases of delivered voltage. The voltage symmetrical components filter 4 comprises resistors 26 and 27 and capacitors 28 and 29, the resistor 26 being connected in series to a capacitor 29 via an outlet 30, the capacitor 28, an outlet 31, the resistor 27 and an outlet 32. The outlets 30 and 32 are connected to the symmetrical components multiplier 6. The current symmetrical components filter 2 and the voltage symmetrical components filter 10 are built around similar circuits. The voltage symmetrical components filter 4 can employ any other circuit commonly used in the art.

The multiplier 5 (FIG. 3), which multiplies symmetrical components by a coefficient equivalent to the coefficient B of the equivalent four-terminal network substituting for the protected section mn, comprises a potentiometer 33 and a phase-shifting circuit 34. The phase-shifting circuit 34 is a bridge circuit built around adjustable resistors 35 and 36 and capacitors 37 and 38. The input of the resistor 35 is connected via an outlet 39 to the capacitor 38, which is coupled to the output of the resistor 35 through an outlet 40, the resistor 36, an outlet 41, the capacitor 37 and an outlet 42. An outlet 43 is connected to the output of the potentiometer 33, the symmetrical components separation unit 2 and the outlet 39. A slide 44 of the potentiometer 33 is joined to the outlet 41, whereas the output of the potentiometer 33 is connected to the current symmetrical components filter 2. The outlet 40 is connected to the input of the band-pass filter 8, and the outlet 42 is connected to the output of the symmetrical components multiplier 6.

The multiplier 6 (FIG. 4), which multiplies symmetrical components by the coefficient A of the equivalent four-terminal network substituting for the protected section mn, comprises an adjustable transformer 45, a potentiometer 46 and a phase-shifting circuit 47. The phase-shifting circuit 47 is a bridge circuit built around adjustable resistors 48 and 49 and capacitors 50 and 51. The input of the resistor 48 is connected through an outlet 52 to the capacitor 51, which is coupled to the output of the resistor 48 through an outlet 53, the resistor 49, an outlet 54, the capacitor 50 and an outlet 55. The primary winding of the adjustable transformer 45 is connected to the voltage symmetrical components filter 4. One end 56 of the secondary winding of the adjustable transformer 45 is connected to the outlet 52. A slider 57 of the potentiometer 46 coupled to a part of the secondary winding of the adjustable transformer 45 is connected to the outlet 54. The outlet 53 is connected to the input of the band-pass filter 8. The outlet 55 is connected to the output of the multiplier 5 multiplying symmetrical components by the coefficient equivalent to the coefficient B of the equivalent four-terminal network substituting for the protected section mn.

Figure 5:
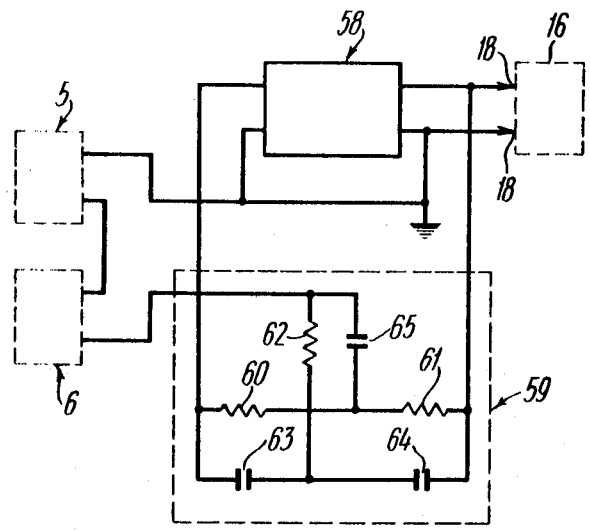
FIG. 5 is an electrical schematic diagram of a fundamental harmonic separation unit, according to the invention.

The fundamental harmonic separation units made as the band-pass filters 8 and 10 are of the same type and in fact are discrimination amplifiers composed of an amplifier 58 proper (FIG. 5) with a double T-shaped bridge 59 included into the feedback circuit. The T-shaped bridge comprises resistors 60, 61 and 62 and capacitors 63, 64 and 65. The amplifier 58 can be built around any known circuit.

The adder 16 (FIG. 1) in the proposed embodiment of an apparatus for protection of a power transmission line is a series of outputs of the band-pass filter 8 and the data reception unit 14. There can be other variations of the adder 16.

Figure 6:
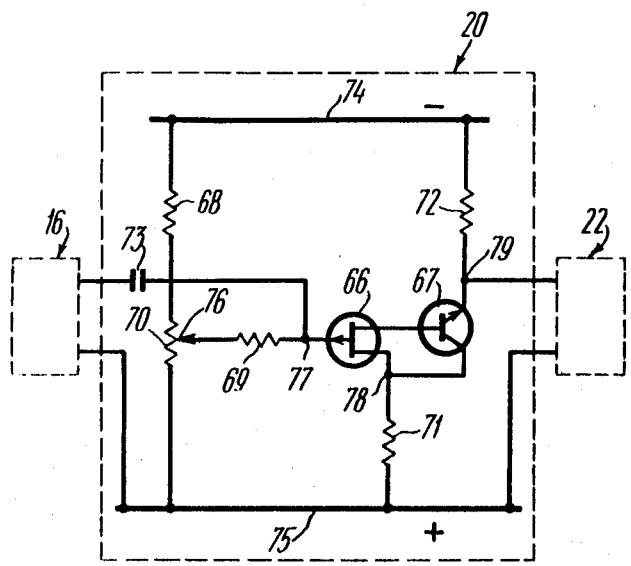
FIG. 6 is an electrical schematic diagram of an amplification unit, according to the invention.

The amplification unit 20 (FIG. 6) is built around two transistors: a field-controlled transistor 66 and a bipolar transistor 67, resistors 68 and 69, a potentiometer 70, resistors 71 and 72 of the amplification circuit and a separating capacitor 73. A negative busbar 74 of the power supply circuit is coupled to a positive busbar 75 through series-connected resistor 68 and the potentiometer 70. A slide 76 of the potentiometer 70 is coupled to the resistor 69, its second output being connected through an outlet 77 to the gate of the field-controlled transistor 66. The outlet 77 is coupled through the separating capacitor 73 to the adder 16 to which the positive busbar 75 is also coupled. The drain of the field-controlled transistor 66 is connected to the base of the bipolar transistor 67. The source of the field-controlled transistor 66 is connected to the collector of the bipolar transistor 67 through an outlet 78. The outlet 78 is connected through the resistor 71 to the positive busbar 75 of the power supply circuit. The emitter of the bipolar transistor 67 is connected to the negative busbar 74 of the power supply circuit through an outlet 79 and the resistor 72. At the same time the outlet 79 and the positive busbar 75 of the power supply circuit are connected to the comparator 22.

Figure 7:
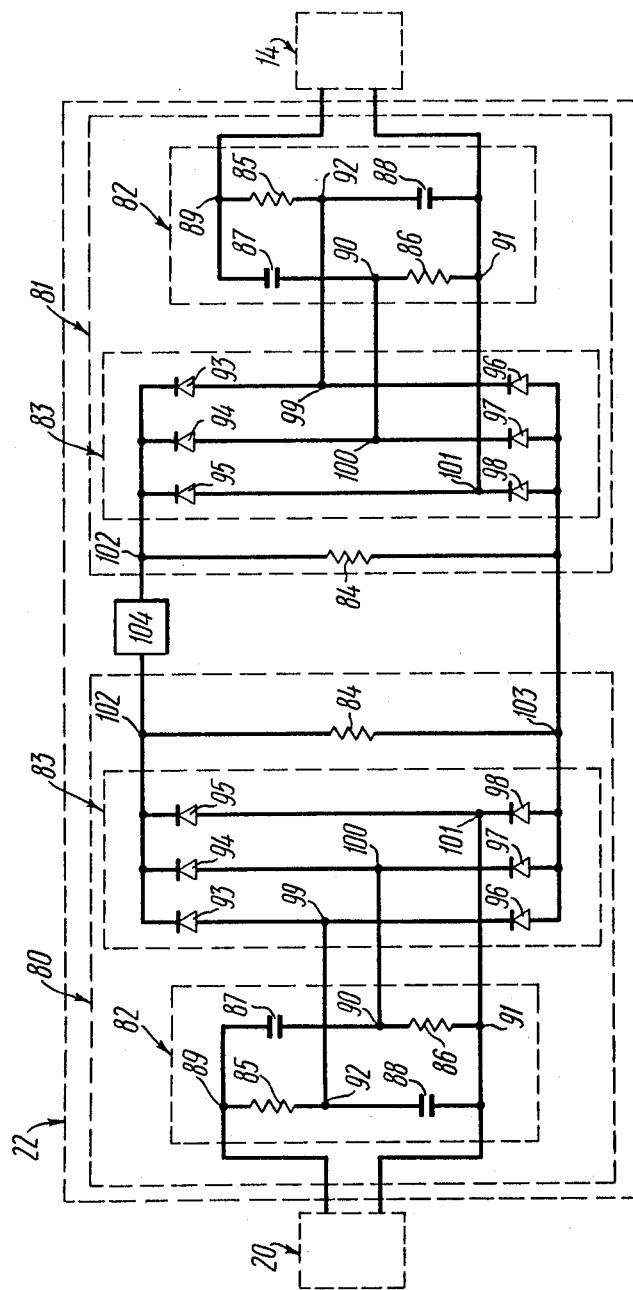
FIG. 7 is an electrical schematic diagram of a comparator, according to the invention.

The comparator 22 (FIG. 7) comprises two similar units 80 and 81 for shaping quantities to be compared, each comprising a circuit 82 for splitting signal-phase voltage into three-phase voltage, a three-phase rectification circuit 83 and a resistor 84. The circuit 82 for splitting single-phase voltage into three-phase voltage is composed of resistors 85 and 86 and capacitors 87 and 88. The input of the resistor 85 is connected through an outlet 89 to the capacitor 87, which is coupled to the output of the resistor 85 through an outlet 90, the resistor 86, an outlet 91, the capacitor 88 and an outlet 92. The outlets 89 and 91 are connected to the amplification unit 20. The unit 81 for shaping quantities to be compared is connected to the data reception unit 14.

The three-phase rectification circuit 83 comprises six diodes 93, 94, 95, 96, 97 and 98 connected in a standard circuit of three-phase rectification. The diode 96 is connected to the diode 93 via an outlet 99. The diode 97 is connected to the diode 94 via an outlet 100. The diode 98 is connected to the diode 95 via an outlet 101. Second outputs of the diodes 93, 94, 95 from a common outlet 102, and second outputs of the diodes 96, 97, 98 form a common outlet 103. The resistor 84 is connected between the outlets 102 and 103. The outlet 92 in the circuit 82 for splitting single-phase voltage into three-phase voltage is connected to the outlet 99 of the three-phase rectification circuit 83. Respectively, the outlet 90 is connected to the outlet 100 and the outlet 91 is connected to the outlet 101. The outlet 102 of the units 80 and 81 for shaping quantities to be compared is connected to a zero indicator 104 of the comparator 22.

FIG. 8 shows a block diagram of an apparatus for protection of a power transmission line with respect to current based on a comparison between the current quantity at the beginning of the protected section $mn$ and the current quantity calculated when there are no faults in the protected section $mn$.

Figure 1:
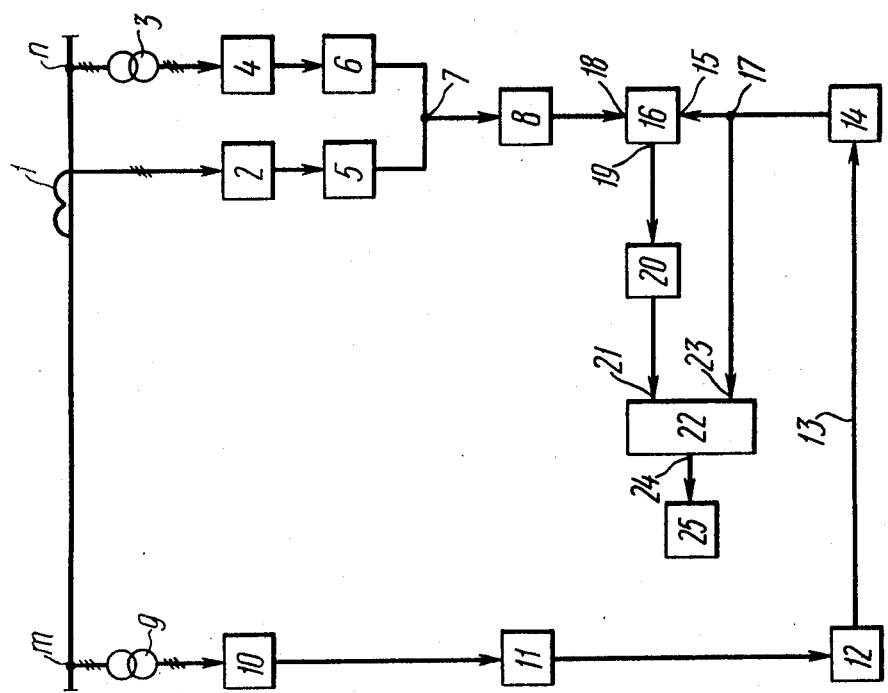
FIG. 1 shows a block diagram of an apparatus for protection of a power transmission line with respect to voltage based on a comparison between the quantity of the voltage at the beginning of the protected section of the power transmission line and the quantity of the voltage calculated when there are no faults in the protected section, according to the invention.

As distinct from the circuit of FIG. 1, a current measuring unit is installed at the beginning of the power transmission line at the point $m$, the unit being made as a current transformer 105 (FIG. 3) connected to a symmetrical components filter 106.

Figure 3:
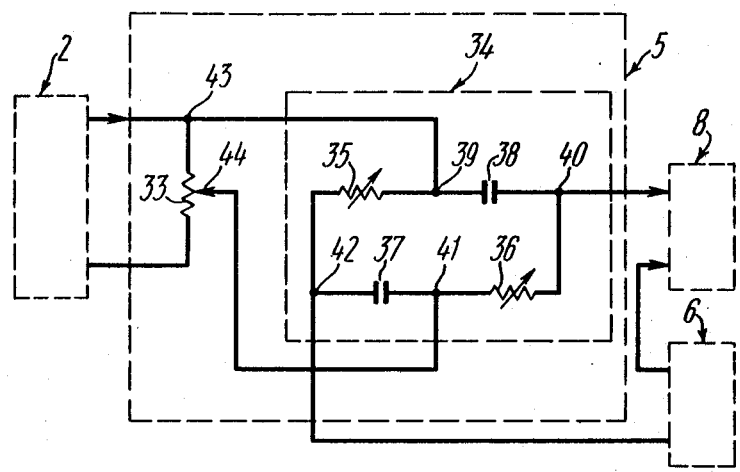
FIG. 3 is an electrical schematic diagram of a symmetrical components multiplier, wherein symmetrical components are multiplied by the coefficient B of a four-terminal network substituting for the protected section of the power transmission line, according to the invention.
Figure 4:
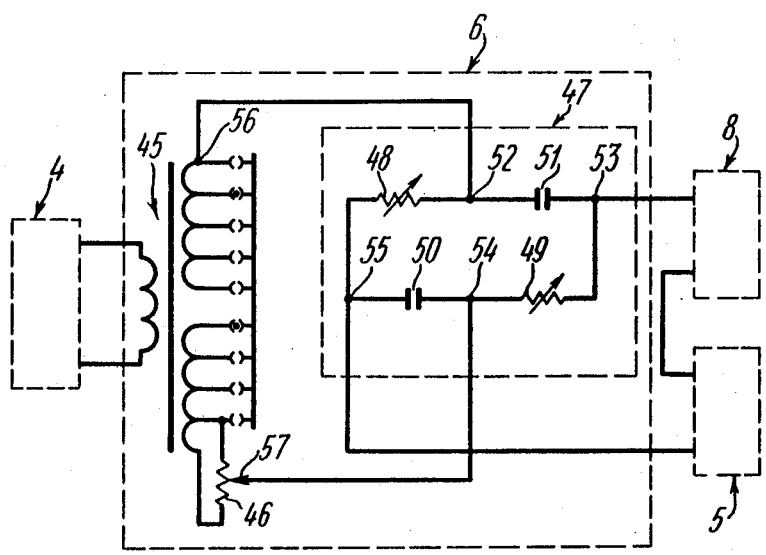
FIG. 4 is an electrical schematic diagram of a multiplier, wherein symmetrical components are multiplied by the coefficient A of the four-terminal network substituting for the protected section of the power transmission line, according to the invention.

At the end of the protected section $mn$ at the point $n$ the current and voltage symmetrical components filters 2 and 4 are connected respectively to multipliers 107 and 108 multiplying symmetrical components by coefficients analogous to the coefficients D and C of the equivalent four-terminal network substituting section $mn$. The circuitry of the symmetrical components multiplier 107 is similar to the circuitry of the symmetrical components multiplier 5 (FIG. 3). Only the parameters of circuit elements are different. The circuitry of the symmetrical components multiplier 108 (FIG. 8) is analogous to the symmetrical components multiplier 6 (FIG. 4). The parameters of circuits elements are, however, different.

FIG. 9 shows a block diagram of an apparatus for protection of a power transmission line with respect to current and voltage based on a comparison between the quantity of current and voltage at the beginning of the protected section $mn$ and the quantities of current and voltage calculated when there are no faults in the protected section $mn$.

In contrast to the circuit of FIG. 1, a current measuring unit is additionally placed at the beginning of the power transmission line at the point $m$, said unit being made as a current transformer 109 (FIG. 9), its output being connected to the symmetrical components filter 106. The voltage and current symmetrical components filters 10 and 106 are provided with a common output 110. The current symmetrical components filter 2 is connected to a common input 111 of the parallel-connected symmetrical components multiplier 5 and a multiplier 112 multiplying symmetrical components by a coefficient analogous to the coefficient D of the equivalent four-terminal network substituting for the protected section $mn$. The voltage symmetrical components filter 4 is connected to a common input 113 of the parallel-connected symmetrical components multiplier 6 and a multiplier 114 multiplying symmetrical components by a coefficient analogous to the coefficient C of the equivalent four-terminal network substituting for the protected section $mn$. The circuitry of the symmetrical components multipliers 112 and 5 is analogous, only the parameters of circuit elements being different. The circuitry of the symmetrical components multipliers 114 and 6 is also analogous, only the parameters of the circuit elements being different.

For better understanding of the essence of the claimed methods of protection of power transmission lines a simplified theoretical substantiation is provided.

The protected section $mn$ of the power transmission line can be regarded as a four-terminal network, that is why the actual voltage $U_m$ and current $J_m$ of the beginning $m$ of the protected section $mn$ are associated with respectively voltage $U_n$ and current $J_n$ of the end $n$ of said protected section $mn$ by the relations:

$$U_m = AU_n + BJ_n \tag{8}$$

$$J_m + CU_n + DJ_n \tag{9}$$

where $A, B, C, D$ are coefficients of the equivalent four-terminal network substituting for the protected section $mn$.

All faults outside this protected section $mn$ leave the relations (8) and (9) unaltered. In the event of damage to the protected section *mn* these relations are upset and assumes the following form:

$$U_m = AU_n + BJ_n + B_k J_k \quad (10)$$

$$J_m = CU_n + DJ_n + D_k J_k \quad (11),$$

where $k$ is the short circuit point in the protected section *mn*;

$B_k$ is a coefficient of the equivalent four-terminal network substituting for the part of the protected section *mn* from the beginning *m* to the short circuit point K.

$J_k$ is the short circuit current in the short circuit point K of the protected section *mn*.

Differences $\Delta U_m$ and $\Delta J_m$ between the actual voltages $U_m$ and currents $J_m$ at the beginning *m* of the protected section *mn*, which are equal to relations (8) and (9) respectively if there is no fault in the protected section *mn* and relations (10) and (11) if there is a fault in this section, and voltages $U_m$ and currents $J_m$ calculated with the help of relations (8) and (9) when there is no fault in the protected section *mn*, can be defined as follows:

$$\Delta U_m = B_k J_k \quad (12)$$

$$\Delta J_m = D_k J_k \quad (13).$$

The differences $\Delta U_m$ of voltages and $\Delta J_m$ of currents are just the quantities which serve to distinguish a short circuit inside and outside the protected zone.

Depending on the equations used and compared quantities three methods are proposed and, respectively, three types of apparatuses for protection of a power transmission line:

when voltages $U_m$ are compared, which are determined by relations (8) and (10), the power transmission line is provided with protection with respect to voltage;

when currents $J_m$ compared, which are determined by relations (9) and (11), the power transmission line is protected with respect to current;

when both voltages $U_m$ and currents $J_m$ are compared, the power transmission line is protected with respect to current and voltage.

The proposed apparatus for protection of a power transmission line with respect to voltage operates as follows. The data on the quantities of current $J_n$ and voltage $U_n$ at the end of the protected section *mn* of the power transmission line is supplied from the current transformer 1 (FIG. 1) and the voltage transformer 3 to the current symmetrical components filter 2 and to the voltage symmetrical components filter 4 in the squence required by measurement technique. The current and voltage symmetrical components filters 2 and 4 transform the delivered three-phase systems of current and voltage respectively into single-phase currents and voltages. Depending on the selected parameters of the resistors 26, 27 (FIG. 2) and capacitors 28 and 29, forward, back voltages or a sum of forward and back voltages is produced at the output of each current and voltage symmetrical components filter 2 and 4.

The voltage $U_n$ at the end n of the protected section *mn* is fed from the output of the voltage symmetrical components filter 4 to the input of the multiplier 6 (FIG. 4) which multiplies symmetrical components by the coefficient equivalent to the coefficient A of the equivalent four-terminal network substituting for the section *mn*, that is it is fed to the primary winding of the adjustable transformer 45. Adjustment of the required value of the modulus of the coefficient A is performed by altering the transformation coefficient of the adjustable transformer 45 by changing the number of loops of the secondary winding of the adjustable transformer 45 (coarse adjustment) and by moving the slide 57 of the potentiometer 46 (fine adjustment). Adjustment of the argument of the coefficient A is performed by changing the resistance of the resistors 48 and 49 of the phase-shifting circuit 47.

The current $J_n$ at the end of the protected section *mn* is fed from the output of the current symmetrical components filter 2 (FIG. 3) to the input of the multiplier 4 which multiplies symmetrical components by the coefficient analogous to the coefficient B of the equivalent four-terminal network substituting for the protected section *mn*, that is to the potentiometer 33. The potentiometer 33 is the load of the current symmetrical components filter 2. By adjustment of the potentiometer 33, a required modulus of the coefficient B is set, whereas by selection of resistance of the resistors 35 and 36 of the phase-shifting circuit 34 a required argument of the coefficient B is set. Both signals carrying data on quantities $AU_n$ and $BJ_n$ are fed from the outputs of the symmetrical components multipliers 5 and 6 (FIG. 5) to the band-pass filter 8. The band-pass filter 8 permits separation of the fundamental harmonic component from the voltage $AU_n + BJ_n$, which corresponds to the voltage $U_m$ at the beginning of the protected section *mn* of the power transmission line calculated when there are no faults in the protected section *mn*. The band-pass filter 8 is connected so that the input signal is inverted at the input, that is at the output of the band-pass filter 8 the voltage fundamental harmonic $[-(AU_n + BJ_n)]$ produced is to be fed to the input 18 of the adder 16 with allowance made for linear damping of the wave propagating along the line.

The voltage $U_m$ of the beginning of the protected section *mn* is fed from the voltage transformer 9 (FIG. 1), positioned at the beginning *m* of the protected section *mn* of the power transmission line, via the voltage symmetrical components filter 10 and the band-pass filter 11, which purpose is similar to that of the symmetrical components voltage filter 4 and the band-pass filter 8, and through the data transmission unit 12, the communications channel 13 to the data reception unit 14. The signal carrying the data on the quantity of the voltage $U_m$ is fed from the data reception unit 14 to the input 15 of the adder 16 and simultaneously to the input 23 of the comparator 22.

Vectorial addition of two voltages $U_m$ is done in the adder 16, one of the voltages being obtained at the output of the band-pass filter 8 and calculated as $[-(AU_n + BJ_n)]$ when there are no faults in the protected section *mn* and the other being the actual voltage $U_m$ at the beginning of the protected section *mn* found with the help of the relation (8) when there is no fault in the protected section and with the help of the relation (10) when there is a fault in the protected section *mn* of the power transmission line. Under normal operating conditions, as well as in the event of any damages outside the zone of the protected section mn, the difference of these two signals is theoretically equal to zero and practically it is a voltage conditioned by errors in measurements of elecgtrical quantities and accuracy of circuit elements execution. In the event of a short circuit inside the zone of the protected section *mn* the difference between these two signals will be $\Delta U_m = B_k J_k$ The difference $\Delta U_m = U_m - AU_n - BJ_n$ is fed from the output 19 of the adder 16 to the amplification unit 20. The amplification unit 20 is essential to increase sensitivity of the apparatus for protection of a power transmission line. In the amplification unit 20 (FIG. 6) the resistors 68 and 69 and the potentiometer 70 serve to set an operational mode with respect to direct current. The separation capacitor 73 is essential to divide the amplifier from the previous stage of the circuit with respect to direct current. The signal proportional to the voltage $p(U_m - AU_n - BJ_n)$ is fed from the output of the amplification unit 20 to the input 21 of the comparator 22.

Here $p$ is a coefficient of amplification of the unit 20.

In the comparator 22 (FIG. 7) the absolute values of two formed quantities $|U_m|$ and $|p(U_m - AU_n - BJ_n)|$ are compared. Each compared quantities shaping unit 80 and 81 of the comparator 22 comprises the circuit 82 for splitting single-phase voltage into three-phase voltage and the three-phase rectification circuit 83. Splitting of the single-phase voltage into the three-phase voltage is employed to reduce the ripple factor of the rectified voltage. This permits avoiding further smoothing of the rectified voltage which contributes to fast action of the circuit.

Splitting of the voltage into three-phase voltage is done by means of two parallel active capacitor separators: the resistor 85 and capacitor 88, and the resistor 86 and the capacitor 87.

Thus obtained three-phase voltage is rectified in the three-phase rectifier circuit. The resistor 84 is the load of the three-phase rectifying circuit 83. The difference between the rectified voltage $|p \Delta U_m|$ and $|U_m|$ is supplied to the zero indicator. When the condition $|p \Delta U_m| - |U_m| > 0$ is observed, which corresponds to a short circuit in the protected section $mn$ of the power transmission line, the effector 25 of the apparatus for protection of the power transmission line with respect to voltage operates. Protection of a power transmission line with respect to voltage possesses an insignificant dead zone to short circuits at the beginning $m$ of the protected section $mn$, since the quantity which determines protection sensitivity $\Delta U_m = B_k J_k$ is small, particularly in transmission lines characterized by light short circuit currents.

In this case the proposed protection method with respect to current can be employed.

This apparatus for protection of a power transmission line with respect to current operates analogously with the apparatus for protection with respect to voltage described above. The differences are the following.

The voltage $U_n$ of the end $n$ of the protected section $mn$ is supplied from the output of the voltage symmetrical components filter 4 (FIG. 8) to the input of the unit 108 multiplying symmetrical components by a coefficient analogous to the coefficient C of the equivalent four-terminal network substituting for the protected section $mn$. The manner of the signal in the symmetrical components multiplier 108 is similar to that in the unit 5 multiplying symmetrical components by the coefficient B in the apparatus for protection of power transmission lines with respect to voltage.

The current $J_n$ of the end $n$ of the protected section $mn$ is supplied from the output of the current symmetrical components filter 2 (FIG. 8) to the input of the unit 107 multiplying symmetrical components by a coefficient analogous to the coefficient D of the equivalent four-terminal network substituting for the protected section $mn$. The signal along the circuits of the multiplier 107 multiplying symmetrical components by the coefficient analogous to the coefficient D is similar to the signal along the circuits of the multiplier 6 (FIG. 1) multiplying symmetrical components by the coefficient analogous to the coefficient A of the equivalent four-terminal network substituting the protected section $mn$ of the power transmission line. Further passage of the signal through the circuits of the band-pass filter 8 (FIG. 8), the adder 16, the comparator 22 is absolutely similar to the passage of the signal through respective units of the apparatus for protection of a power transmission line with respect to voltage (FIG. 1).

From the current transformer 105 (FIG. 8) positioned at the beginning $m$ of the protected section $mn$ of the power transmission line the data on the current at the beginning $m$ of the protected section $mn$ is fed to the symmetrical components current filter 106.

Further on the passage of the signal is analogous to that of the signal in the apparatus for protection of a power transmission line with respect to voltage (FIG. 1).

The zero indicator 104 (FIG. 7) of the apparatus for protection of a power transmission line with respect to current receives the difference between two rectified voltages proportional to quantities $|p \Delta J_m|$ and $|J_m|$. When $|P \Delta J_m| - |J_m| > 0$, which corresponds to a short circuit in the protected section $mn$ of the power transmission line, the effector 25 operates. In power transmission lines, wherein the wave length is close to 90 electrical degrees, the method of protection with respect to current possesses an insensitive zone at the end of the protected section, since the difference $\Delta J_m = D_k J_k$ is too small.

That is why a method of protection with respect to current and voltage is proposed. The apparatus for protection of a power transmission line with respect to current and voltage is similar in its operation to the forementioned apparatuses for protection of power transmission lines. The difference is as follows.

The voltage $U_n$ of the end of the protected section $mn$ is supplied from the output of the symmetrical components voltage filter 4 (FIG. 9) simultaneously to the inputs of the multipliers 114 and 6 multiplying symmetrical components by coefficients analogous respectively to coefficients C and A of the equivalent four-terminal network substituting for the protected section $mn$.

The current $J_n$ of the end $n$ of the protected section $mn$ is supplied from the output of the symmetrical components current filter 2 to the inputs of the multipliers 112 and 5 multiplying symmetrical components by the coefficients analogous respectively to the coefficients D and B of the equivalent four-terminal network substituting for the protected section $mn$. The passage of signals in the symmetrical components multipliers 5 and 112 and 6 and 114 (FIG. 9) is similar to passage of signals respectively in the symmetrical components multipliers 5 and 6 (FIG. 1).

Further passage of the signal carrying data on the sum of the quantities $AU_n + BJ_n + CU_n + DJ_n$ is analogous to the passage of signals in the apparatus for protection of power transmission lines with respect to voltage (FIG. 1) in respective units.

Data on current and voltage are fed from the current transformer 109 (FIG. 9) and the voltage transformer 9 positioned at the beginning $m$ of the protected section mn of the power transmission line respectively to the symmetrical components current filter 106 and voltage filter 10. The band-pass filter 11 receives compensated voltage equal to the sum of the voltage $U_m$ and the voltage proportional to the current at the beginning m of the protected section mn.

Further passage of the signal is analogous to passage of the signal in the apparatus for protection of power transmission lines with respect to voltage (FIG. 1). The zero indicator 104 (FIG. 7) of the apparatus for protection of the power transmission line with respect to current and voltage (FIG. 9) receives signals from the outputs of the amplification unit 20 and from the output of the data reception unit 14, the result of their comparison being an indication for the operation of the effector 25. The apparatus for protection of power transmission lines with respect to current and voltage has no insensitive zones and operates selectively in the event of a short circuit at any point on the line.

The proposed methods and apparatuses for protection of power transmission lines are thus compatible with any circuits of AC high and superhigh voltage transmission lines, in adjusted power transmission lines (unit, semiunit and integrated variations), compensated long-range power transmission lines and conventional high and superhigh voltage transmission lines of comparatively short ranges.

At present the proposed method is the only possible method of protection of adjusted transmission lines. When used in long-range power transmission lines and conventional high and superhigh voltage transmission lines, the proposed method possesses certain advantages over other methods owing to the fact that protection based on the proposed method does not by its operational principle react to swinging and asynchronous operation of the system, and selectively operates in overloaded transmission lines, where currents in a normal condition are but slightly different from emergency conditions currents, which results in insensitivity to faults of the majority of existing protecting systems.

Besides, the operation of the proposed apparatuses for protection of power transmission lines does not depend on operational conditions of transmission lines and/or on the presense of free harmonic components in the short circuit current and voltage, which is particularly important when switching over to a higher voltage level of 750-1, 150 kv.

What is claimed is:

1. A method of protection of a power transmission line based on a comparison between an actual quantity of current at the beginning of the protected section of the power transmission line and a quantity of current of the protected section calculated when there are no faults in the protected section, comprising the steps of:

(a) measuring current and voltage at the end of said protected section of said power transmission line;

(b) separating respective symmetrical components from said current and voltage at the end of said protected section of said power transmission line;

(c) multiplying said separated symmetrical component of said voltage by a first coefficient of an equivalent four-terminal network substituting for said protected section of said power transmission line in a no-damage condition;

(d) multiplying said separated symmetrical component of said current by a second coefficient of said four-terminal network substituting for said protected section of said power transmission line in a no-damage condition to obtain a symmetrical voltage component proportional to said current at the end of said protected section;

(e) adding said multiplied symmetrical component of said voltage to said symmetrical voltage component proportional to said current at the end of said protected section to obtain an equivalent voltage proportional to said current at said beginning of said protected section of said power transmission line calculated when there are no faults in said protected section;

(f) separating a fundamental harmonic from said equivalent voltage;

(g) measuring current at said beginning of said protected section and voltage proportional to said current at said beginning;

(h) separating a respective symmetrical component from said current at said beginning;

(i) separating a fundamental harmonic from said separated symmetrical component of said current at the beginning, said fundamental harmonic of the current being in proportion to the fundamental voltage harmonic proportional to the current at the beginning of the protected section;

(j) adding said fundamental harmonic obtained from said equivalent voltage to said fundamental harmonic of said voltage proportional to said current at the beginning to obtain a difference of said fundamental harmonics;

(k) amplifying said difference of fundamental harmonics, and (l) comparing said amplified difference between fundamental harmonics to said fundamental harmonic obtained from said separated symmetrical component of said current at the beginning of said protected section.

2. A method of protection of a power transmission line based on a comparison between an actual quantity of voltage at the beginning of the protected section of the power-transmission line and a quantity of voltage calculated when there are no faults in the protected section, comprising the steps of:

(a) measuring current and voltage at the end of said protected section of said power transmission line;

(b) separating respective symmetrical components of said current and voltage at said end of said protected section;

(c) multiplying said separated symmetrical component of said voltage by a first coefficient of a four-terminal network substituting for said protected section at a no-damage condition;

(d) multiplying said separated symmetrical component of said current by a second coefficient of the four-terminal network substituting for said protected section at a no-damage condition to obtain a symmetrical component of voltage proportional to said current at the end of said protected section;

(e) adding said multiplied symmetrical component of said voltage to said multiplied symmetrical component of the voltage proportional to said current at the end of said protected section to obtain an equivalent voltage proportional to the voltage at said beginning of the line calculated when there are no faults in said protected section;

(f) separating a fundamental harmonic from said equivalent voltage;

(g) measuring voltage at the beginning of said protected section;

(h) separating a respective symmetrical component from said voltage at said beginning of said protected section;

(i) separating a fundamental harmonic from said separated symmetrical component of said voltage at said beginning of said protected section;

(j) adding said fundamental harmonic of said voltage at said beginning of said protected section to said fundamental harmonic of said equivalent voltage to obtain the difference of said fundamental harmonics;

(k) amplifying said difference of said fundamental harmonics; and (l) comparing said amplified difference of said fundamental harmonics to said fundamental harmonic obtained from said separated symmetrical component of said voltage at said beginning of said protected section.

3. A method of protection of a power transmission line based on a comparison between actual quantities of voltage and current at the beginning of the protected section of the power transmission line and electrical quantities calculated when there are no faults in said protected section, comprising the steps of:

(a) measuring current and voltage at the end of said protected section of said power transmission line;

(b) separating respective symmetrical components from said current and voltage at said end of said protected section;

(c) multiplying each of said separated symmetrical components of said current and voltage by two coefficients of an equivalent four-terminal network substituting for said protected section at a no-damage condition to obtain as a result two symmetrical components of said voltage at the end of said protected section and two symmetrical components of the voltage proportional to the current at the end of said protected section;

(d) adding two multiplied separated symmetrical components of said voltage at the end of said protected section to said two symmetrical components of the voltage proportional to the current at the end of said protected section to obtain an equivalent voltage proportional to the sum of said voltage at said beginning and said voltage proportional to said current at said beginning calculated when there are no faults in said protected section;

(e) separating a fundamental harmonic from said equivalent voltage;

(f) measuring voltage and current at said beginning of said protected section;

(g) separating respective symmetrical components from said current and voltage at said beginning of said protected section, the symmetrical current component being in conformity with the symmetrical component of voltage proportional to said current at the beginning of said protected section;

(h) adding said respective symmetrical component of said voltage at said beginning to said symmetrical component of voltage proportional to said current at said beginning to obtain as a result a compensated voltage;

(i) separating a fundamental harmonic from said compensated voltage;

(j) adding said fundamental harmonic from said equivalent voltage to said fundamental harmonic from said compensated voltage to obtain as a result a difference of said fundamental harmonics;

(k) amplifying said difference of said fundamental harmonics; and (l) comparing said amplifiedd difference of said fundamental harmonics to said fundamental harmonic of said compensated voltage.

4. An apparatus for protection of a power transmission line with respect to current based on a comparison between an actual quantity of current at the beginning of the protected section of the power transmission line, transmitted along a communications channel by means of a data transmission unit and a data reception unit, and a quantity of current calculated when there are no faults in the protected section, comprising:

(a) current measuring units, a first of said current measuring units being positioned at the end of said protected section of said power transmission line and a second of said current measuring units being positioned at the beginning of said protected section of said power transmission line;

(b) a voltage measuring unit positioned at the end of said protected section of said transmission line;

(c) three symmetrical components separation units transforming the three-phase system of said current and voltage into a single-phase system, a first and a second of said symmetrical components separation units being positioned at the end of said protected section, the first symmetrical components separation unit being connected to said voltage measuring unit and the second symmetrical components separation unit being connected to said first current measuring unit positioned at the end of said protected section, a third of said symmetrical components separation units being positioned at the beginning of said protected section and being connected to said second current measuring unit located at the beginning of said protected section;

(d) symmetrical components multipliers, which multiply said separated symmetrical components by respective coefficients of an equivalent four-terminal network substituting for said protected section at a no-damage condition, said symmetrical components multipliers being positioned at the end of said protected section, and being connected respectively to said first and second symmetrical components separation units positioned at the end of said protected section, and being provided with a common output;

(e) fundamental harmonic separation units, a first of said fundamental harmonic separation units being positioned at the end of said protected section and being connected to said common output of said symmetrical components multipliers, a second of said fundamental harmonic separation units being positioned at the beginning of said protected section and being connected to said third symmetrical components separation unit;

(f) an adder for summation of said compared electrical quantities having a first and a second input and an output, said adder being positioned at the end of said protected section of said power transmission line, said first inputs of said adder being connected to said first fundamental harmonic separation unit located at the end of said protected section of said power transmission line; said second input of said adder being connected via said data reception unit, said communications channel and said data transmission unit to said second fundamental harominc separation unit positioned at the beginning of said protected section of said power transmission line;

(g) an amplification unit connected to said output of said adder;

(h) a comparator having a first and a second input and an output, said first input of said comparator being connected to said amplification unit, said second input of said comparator being connected to said second input of said adder;

(i) an effector, which cuts off said protected section of said power transmission line in case it is damaged, connected to said output of said comparator.

5. An apparatus for protection of a power transmission line with respect to voltage based on a comparison between an actual quantity of voltage at the beginning of the protected section of said power transmission line, transmitted along a communications channel by means of a data transmission unit and a data reception unit, and a quantity of voltage calculated when there are no faults in said protected section, comprising;

(a) a current measuring unit positioned at the end of said protected section;

(b) voltage measuring units, a first of said voltage measuring units being positioned at the end of said protected section of said power transmission line, a second of said voltage measuring units being positioned at the beginning of said protected section of said power transmission line;

(c) three symmetrical components separation units which transform the three-phase system of said electrical quantities of current and voltage into a single-phase system, a first and a second of said symmetrical components separation units being positioned at the end of said protected section, the first of said symmetrical components separation units being connected to said current measuring unit and the second of said symmetrical components separation units being connected to said first voltage measuring unit positioned at the end of said protected section, a third of said symmetrical components separation unit being positioned at the beginning of said protected section and being connected to said second voltage measuring unit located at the beginning of said protected section;

(d) symmetrical components multipliers which multiply said separated symmetrical components by respective coefficients of an equivalent four-terminal network substituting for said protected section at a no-damage condition, said symmetrical components multipliers being positioned at the end of said protected section, being connected respectively to said first and second symmetrical components separation units positioned at the end of said protected section, and being provided with a common output;

(e) fundamental harmonic separation units, a first of said fundamental harmonic separation units being positioned at the end of said protected section and being connected to said common output of said symmetrical components multipliers, a second of said fundamental harmonic separation units being positioned at the beginning of said protected section and being connected to said third symmetrical components separation units;

(f) an adder for summation of said compared electrical quantities having a first and a second input and an output, said adder being positioned at the end of said protected section, said first input of said adder being connected to said first fundamental harmonic separation unit located at the end of said protected section, said second input of said adder being connected via said data reception unit, said communications channel and said data transmission unit to said second fundamental harmonic separation unit located at the beginning of said protected section;

(g) an amplification unit connected to said output of said adder;

(h) a comparator having a first and a second input and an output, said first input of said comparator being connected to said amplification unit, said second input of said comparator being connected to said second input of said adder; and (i) an effector, which cuts off said protected section of said power transmission line if it is damaged, connected to said output of said comparator.

6. An apparatus for protection of a power transmission line with respect to current and voltage based on a comparison between actual quantities of voltage and current at the beginning of the protected section of the power transmission line, transmitted along a communications channel by means of data reception and transmission units, and quantities of voltage and current calculated when there are not faults in the protected section, which comprises:

(a) current measuring units, a first of said current measuring units positioned at the end of said protected section of said power transmission line, a second of said current measuring units being positioned at the beginning of said protected section of said power transmission line;

(b) voltage measuring units, a first of said voltage measuring units being positioned at the end of said protected section, a second of said voltage measuring units being positioned at the beginning of said protected section;

(c) four symmetrical components separation units which transform the three-phase system of said electrical quantities of current and voltage into a single-phase system, a first and a second of said symmetrical components separation units being positioned at the end of said protected section of said power transmission line, said first symmetrical components separation unit being connected to said first voltage measuring unit, said second symmetrical components separation unit being connected to said first current measuring unit, a third and a fourth of said symmetrical components separation units being positioned at the beginning of said protected section and being connected respectively to said second current measuring unit and said second voltage measuring unit, said third and said fourth symmetrical components separation units being provided with a common output;

(d) four symmetrical components multipliers which multiply said separated symmetrical components by respective coefficients of an equivalent four-terminal network substituting for said protected section at a no-damage condition, said symmetrical components multipliers being positioned at the end of said protected section, a first and a second of said symmetrical components multipliers are provided with a common output connected to said first symmetrical components separation unit located at the end of said protected section, the third and fourth of said four symmetrical components separation units are provided with a common output connected to said second symmetrical components separation unit located at the end of said protected section, said four symmetrical components multipliers being provided with a common output;

(e) fundamental harmonic seperation units, a first of said fundamental harmonic separation units being positioned at the end of said protected section and being connected to said common output of said four symmetrical components multipliers, a second of said fundamental harmonic separation units being positioned at the beginning of said protected section and being connected to said common output of said third and fourth symmetrical components separation units;

(f) an adder for summation of said compared electrical quantities having a first and a second input and an output, said adder being positioned at the end of said protected section, said first input of said adder being connected to said first fundamental harmonic separation unit located at the end of said protected section, said second input of said adder being connected via said data reception unit, said communications channel and said data transmission unit to said second fundamental harmonic separation unit located at the beginning of said protected section;

(g) an amplification unit connected to said output of said adder;

(h) a comparator having a first and a second input and an output, said first input of said comparator being connected to said amplification unit, said second input of said comparator being connected to said second input of said adder; and (i) an effector, which cuts off said protected section if it is damaged, connected to said output of said comparator.

* * * * *